United States Patent
Chandra Sekar Rao

(10) Patent No.: US 11,562,011 B2
(45) Date of Patent: Jan. 24, 2023

(54) INCORPORATING DATA INTO SEARCH ENGINES USING DEEP LEARNING MECHANISMS

(71) Applicant: EMC IP Holding Company LLC, Hopkinton, MA (US)

(72) Inventor: Venkata Chandra Sekar Rao, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 199 days.

(21) Appl. No.: 16/173,010

(22) Filed: Oct. 29, 2018

(65) Prior Publication Data

US 2020/0134038 A1 Apr. 30, 2020

(51) Int. Cl.
| | |
|---|---|
| G06F 16/33 | (2019.01) |
| G06N 3/08 | (2006.01) |
| G10L 15/16 | (2006.01) |
| G06K 9/62 | (2022.01) |
| G10L 15/18 | (2013.01) |
| G06F 16/338 | (2019.01) |

(52) U.S. Cl.
CPC ........ *G06F 16/3347* (2019.01); *G06F 16/338* (2019.01); *G06K 9/6215* (2013.01); *G06N 3/08* (2013.01); *G10L 15/16* (2013.01); *G10L 15/18* (2013.01)

(58) Field of Classification Search
CPC . G06F 16/3347; G06F 16/338; G06K 9/6215; G06K 9/00536; G06K 9/627; G06N 3/08; G10L 15/16; G10L 15/18; G06V 30/1985
See application file for complete search history.

(56) References Cited

U.S. PATENT DOCUMENTS

| | | | |
|---|---|---|---|
| 9,535,960 B2 | 1/2017 | Guo et al. | |
| 9,715,496 B1* | 7/2017 | Sapoznik | G06F 16/90332 |
| 10,311,058 B1* | 6/2019 | Kumar | G06N 3/08 |
| 2011/0196855 A1* | 8/2011 | Wable | G06F 16/24554 |
| | | | 707/711 |

(Continued)

OTHER PUBLICATIONS

Pollock et al., What's Wrong with Internet Searching, D-Lib Magazine, Mar. 1997.

*Primary Examiner* — Alford W Kindred
*Assistant Examiner* — Cao D Vuong
(74) *Attorney, Agent, or Firm* — Ryan, Mason & Lewis, LLP

(57) ABSTRACT

Methods, apparatus, and processor-readable storage media for incorporating data into search engines using deep learning mechanisms are provided herein. An example computer-implemented method includes extracting one or more features from a search query by applying one or more machine learning algorithms to the search query; generating one or more word vectors by applying at least one deep learning technique to the one or more extracted features; mapping the one or more generated word vectors to one or more words from a corpus of data by implementing at least one deep similarity network; and outputting one or more results in response to the search query, wherein the one or more results are based at least in part on the one or more words from the corpus to which the one or more generated word vectors were mapped.

20 Claims, 8 Drawing Sheets

(56) References Cited

U.S. PATENT DOCUMENTS

| | | | |
|---|---|---|---|
| 2012/0290622 A1* | 11/2012 | Kumar | G06F 16/34 |
| | | | 707/780 |
| 2015/0379610 A1* | 12/2015 | Stankiewicz | G06F 40/216 |
| | | | 705/26.7 |
| 2018/0113676 A1* | 4/2018 | De Sousa Webber | ........ |
| | | | G06F 40/279 |
| 2018/0137551 A1* | 5/2018 | Zheng | G06K 9/00442 |
| 2019/0114348 A1* | 4/2019 | Gao | G06N 3/082 |
| 2019/0340503 A1* | 11/2019 | Cheng | G06F 16/3332 |
| 2019/0361987 A1* | 11/2019 | Qiao | G06F 16/345 |

\* cited by examiner

```
import numpy as np def TokenizeChunk (data, steps=16, dims=16384) :
    data = TokenizeLengthHash (data, steps=steps, dims=dims)
    ret = [ ]
    stepsize = int(len(data) / float(steps))

for percent in np.arange (0, 1, 1 / float(steps)) :
        idx = int(len(data) · percent)
        unq, cnt = np.unique(data[idx:idx + stepsize], return_counts=True)
        newarray = np.zeros(dims / steps)
        for v, c in zip(unq, cnt) :
            newarray[v] = c
        ret.append(newarray)
    return ret
```

```
import re
import murmur # the murmur hashing library def TokenizeLengthHash (data, steps=16, dims=16384) :
    feats = re.findall(r"([^\x00-\x7F] + | \w+)", data)
    final_feats = [ ]
    for feat in feats:
        loglength = int(min(8, max(1, math.log(len(feat), 1.4)))) - 1 # 0-7
        shash = murmur.string_hash(feat) % (dims / steps / 8)
        final_feats.append(loglength · (dims / steps / 8) + shash)
    return final_feats
```

FIG. 5

```
def create_model():
    # create model
    model = Sequential()
    model.add(Dense(60, input_dim=60, kernel_initializer='normal', activation='relu', kernel_constraint=maxnorm(3)))
    model.add(Dropout(0.2))
    model.add(Dense(30, kernel_initializer='normal', activation='relu', kernel_constraint=maxnorm(3)))
    model.add(Dropout(0.2))
    model.add(Dense(1, kernel_initializer='normal', activation='sigmoid'))
    # Compile model
    sgd = SGD(lr=0.1, momentum=0.9, decay=0.0, nesterov=False)
    model.compile(loss='binary_crossentropy', optimizer=sgd, metrics=['accuracy'])
    return model
```

INCORPORATING DATA INTO SEARCH ENGINES USING DEEP LEARNING MECHANISMS

FIELD

The field relates generally to information processing systems, and more particularly to techniques for processing search queries using such systems.

BACKGROUND

The Internet's potential as a significant revenue-generating tool can be more efficiently realized if users can receive more precise and relevant results from Internet search queries. However, conventional query processing approaches face various challenges in providing precise and relevant results. For example, users performing Internet searches related to computer-related products or services may possess varying ranges of technological know-how, resulting in search queries that can contain a wide variety of terminology. Additionally, even in search queries that contain technologically-accurate terminology, the user may include additional language that can be unnecessary and/or irrelevant, which can also lead to inaccurate results.

SUMMARY

Illustrative embodiments of the invention provide techniques for incorporating data into search engines using deep learning mechanisms. An exemplary computer-implemented method can include extracting one or more features from a search query by applying one or more machine learning algorithms to the search query; generating one or more word vectors by applying at least one deep learning technique to the one or more extracted features; mapping the one or more generated word vectors to one or more words from a corpus of data by implementing at least one deep similarity network; and outputting one or more results in response to the search query, wherein the one or more results are based at least in part on the one or more words from the corpus to which the one or more generated word vectors were mapped.

Illustrative embodiments can provide significant advantages relative to conventional query processing approaches. For example, challenges associated with accurately processing inconsistent and/or varying search query terminology are overcome through the use of a deep similarity network to predict accurate search results based on deep learning-based analysis of the natural text of user search queries.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for feature extraction in an illustrative embodiment.

FIG. 4 shows example pseudocode for hashing in an illustrative embodiment.

FIG. 5 shows example pseudocode for an inspector network in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
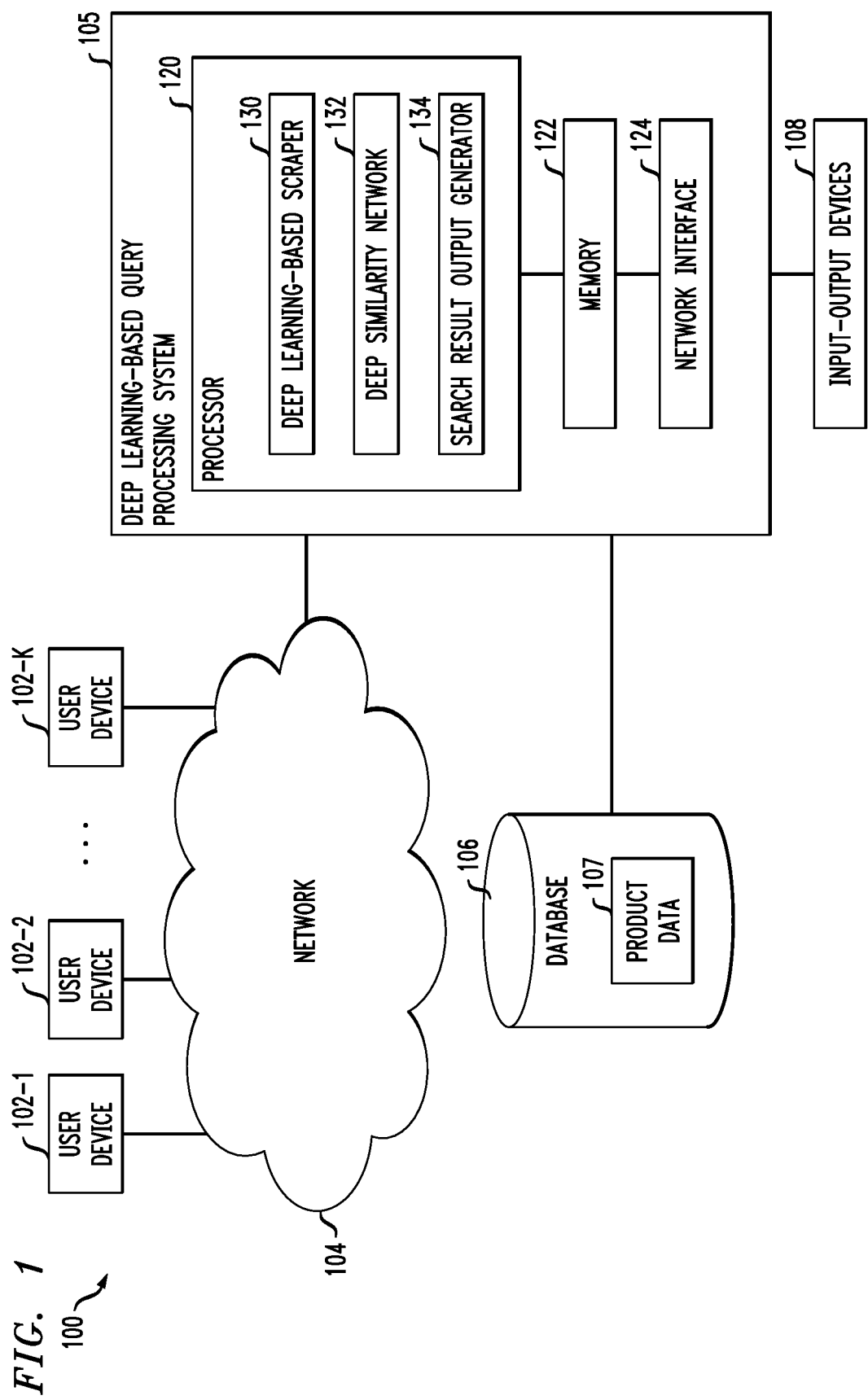
FIG. 1 shows an information processing system configured for dynamically updating and responding to search queries in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a deep learning-based query processing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The deep learning-based query processing system 105 has an associated database 106 configured to store product data 107 characterizing multiple products within an organization or other enterprise. Such product data can include product features, capabilities, pricing, etc.

The database 106 in the present embodiment is implemented using one or more storage systems associated with the deep learning-based query processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the deep learning-based query processing system 105 are input-output devices 108, which illustratively comprise keyboards, displays or other types of input-output devices in any combination. Such input-output devices are used to support one or more user interfaces to the deep learning-based query processing system 105, as well as to support communication between the deep learning-based query processing system 105 and other related systems and devices not explicitly shown.

The deep learning-based query processing system 105 in the FIG. 1 embodiment is assumed to be implemented using at least one processing device. Each such processing device generally comprises at least one processor and an associated memory, and implements one or more functional modules for controlling certain features of the deep learning-based query processing system 105.

More particularly, the deep learning-based query processing system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the deep learning-based query processing system 105 to communicate over the network 104 with the user devices 102, and illustratively comprises one or more conventional transceivers.

The processor 120 further comprises a deep learning-based scraper 130, a deep similarity network 132, and a search result output generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the deep learning-based scraper 130, deep similarity network 132, and search result output generator 134 may be implemented at least in part in the form of software that is stored in memory 122 and executed by processor 120.

It is to be understood that the particular set of elements shown in FIG. 1 for dynamically updating and responding to search queries involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the deep learning-based query processing system 105 can be eliminated and associated elements such as deep learning-based scraper 130, deep similarity network 132, and search result output generator 134 can be implemented elsewhere in the computer network 100.

An exemplary process utilizing deep learning-based scraper 130, deep similarity network 132, and search result output generator 134 of the deep learning-based query processing system 105 in computer network 100 will be described in more detail with reference to the flow diagram of FIG. 8.

As further detailed herein, one or more embodiments of the invention include implementing a solution and/or mechanism for searching for products via a natural text and/or speech engine. In such an embodiment, the user's current knowledge, needs, preferences, etc. can be mapped to appropriate product-related requirements. Additionally, in such an embodiment, search terms are created by the machine/system (based on analysis of user input) rather than by the human user.

Deep learning-based analysis can be carried out across various data derived from sources such as, for example, product catalog(s) (wherein such data can include system configurations, product genres, etc.), customer reviews (wherein such data can include identification of system and/or product issues, etc.), third-party product reviews (wherein such data can include identification of desirable product features, pricing information, etc.), and sales calls (wherein such data can include user/customer interactions and feedback, etc.).

Figure 2:
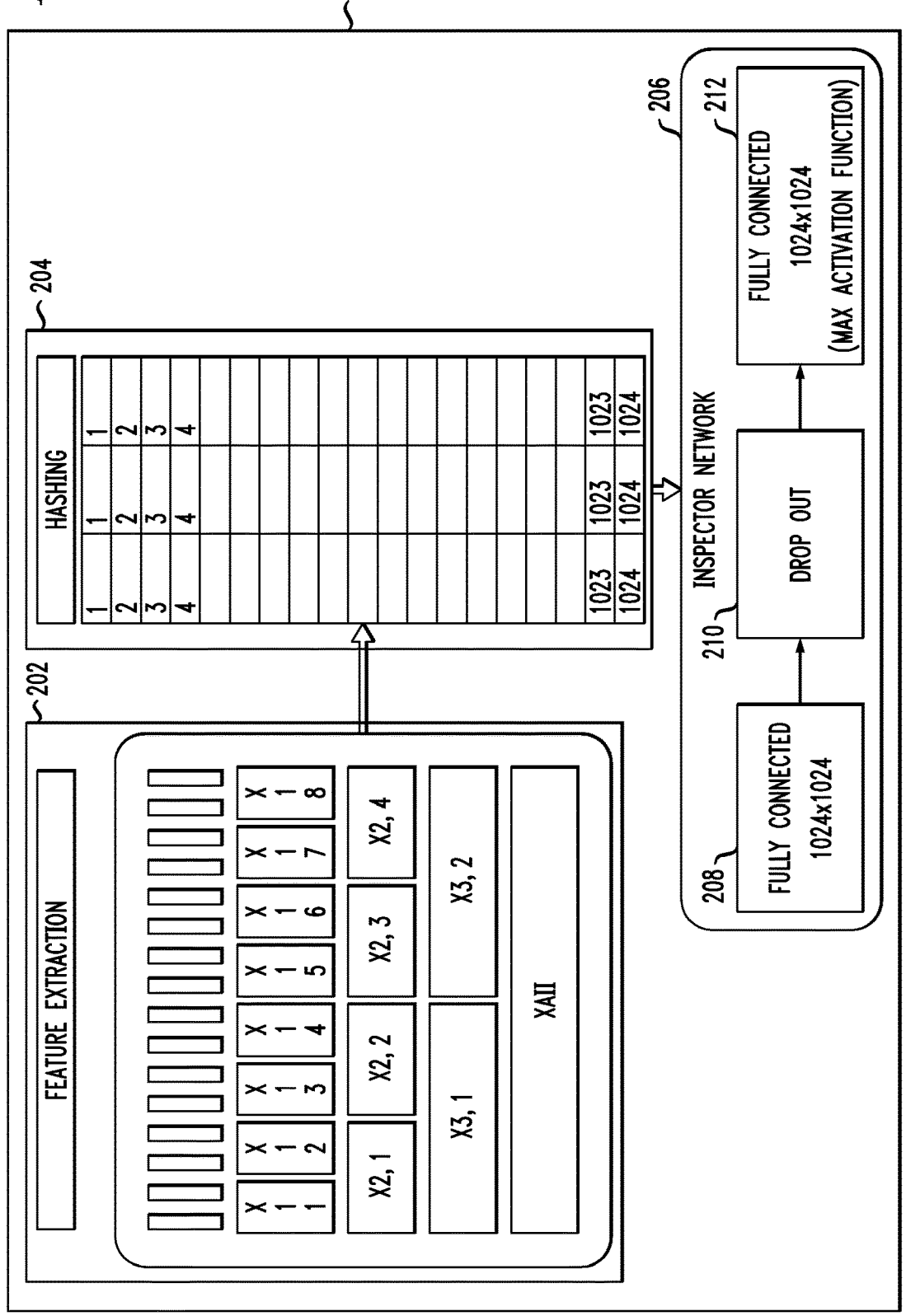
FIG. 2 shows system architecture for a deep learning-based scraper in an illustrative embodiment of the invention.

FIG. 2 shows system architecture for the deep learning-based scraper 130 in an illustrative embodiment of the invention. As detailed herein, the deep learning-based scraper 130 can carry out functions based on a stream of tokens extracted from data sources such as customer reviews, third party websites, sales calls, etc. The above-noted tokens can refer to data extracted from one or more third-party web pages for particular products. By way merely of example, tokens that might be extracted from a web page selling a particular laptop might include "Processing power for CAD/AUTOCAD/CAM," "3D Modelling," "To run business demand applications," and/or "Awkwardly placed webcam (Cons), not to be chosen while suggesting a laptop with a good web cam."

Additionally, in one or more embodiments of the invention, the deep learning-based scraper 130 is able to understand hierarchical relationships within data, and can be configured to annotate and/or tag the accurate product to customer and/or third-party reviews.

As specifically depicted in FIG. 2, the deep learning-based scraper 130 can include various components (202, 204 and 206), which can be implemented to generate and/or obtain an accurate hierarchical bag of words (BOW). For example, a feature extraction component 202 can divide each document and/or review into a given number (for example, 16) of equal-length word chunks. Additionally, a hashing component 204 can apply a hashing of a given number of bins (for example, 1024 bins) to the equal-length word chunks (generated via component 202) and provide the output to an inspector network 206. By way merely of example, an output of the hashing component 204 that is passed along to the inspector network 206 might include the following. For example, processing power for CAD/AUTOCAD/CAM related to Laptop X (assuming numerical value as 100) can be tokenized into processing power, CAD, CAM, AUTOCAD, wherein processing power −1×100 (multiply with the product numeric value), CAD-2×100, CAM-3×100, and AUTOCAD-4×100. In such an example, the sequence of numbers, 100, 200, 300, 400 . . . , etc., can be passed to the inspector network 206.

The inspector network 206, using the hash output generated by component 204, identifies one or more hierarchical relationships of the reviews against each of one or more products. Such hierarchical relationships can be identified, for example, by feeding the hash output to a neural network. Additionally, within the inspector network, in step 208, fully connected refers to mapping a feature to the model; for example feature, value 300 can be mapped to 100 (Laptop X, as noted in the example above). Additionally, in step 210, drop out refers to dropping and/or removing any words common to all of the particular product (for example, "not," "while," etc.). Also, in step 212, fully connected refers to, after the drop out step in step 210, again mapping features to the product.

FIG. 3 shows example pseudocode 300 for feature extraction (as depicted via component 202 in FIG. 2) in an illustrative embodiment. In this embodiment, pseudocode 300 is executed by or under the control of a processing system, such as deep learning-based query processing system 105, or another type of processing platform. For example, the pseudocode 300 may be viewed as comprising a portion of a software implementation of at least part of the deep learning-based scraper 130 of the FIG. 1 embodiment.

The pseudocode 300 illustrates a process for feature extraction. Specifically, pseudocode 300 details dividing a sentence into 16 different chunks, determining the unique features available in the sentence, and storing such features in "ret" array.

It is to be appreciated that this particular pseudocode shows just one example implementation of a process for feature extraction, and alternative implementations of the process can be used in other embodiments.

FIG. 4 shows example pseudocode 400 for hashing (as depicted via component 204 in FIG. 2) in an illustrative embodiment. In this embodiment, pseudocode 400 is executed by or under the control of a processing system, such as deep learning-based query processing system 105, or another type of processing platform. For example, the pseudocode 400 may be viewed as comprising a portion of a software implementation of at least part of the deep learning-based scraper 130 of the FIG. 1 embodiment.

The pseudocode 400 illustrates a process for hashing. Specifically, pseudocode 400 details that, for each feature extracted via pseudocode 300 in FIG. 3, and for each character present in a word converting into a number with the 0-7 range, converting the word to a hash value, and appending the hash value with (number generated [0-7])* (number of steps/8).

It is to be appreciated that this particular pseudocode shows just one example implementation of a process for hashing, and alternative implementations of the process can be used in other embodiments.

FIG. 5 shows example pseudocode 500 for an inspector network (as depicted via component 206 in FIG. 2) in an illustrative embodiment. In this embodiment, pseudocode 500 is executed by or under the control of a processing system, such as deep learning-based query processing system 105, or another type of processing platform. For example, the pseudocode 500 may be viewed as comprising a portion of a software implementation of at least part of the deep learning-based scraper 130 of the FIG. 1 embodiment.

The pseudocode 500 illustrates a process for identifying hierarchical relationships among given data. Specifically, pseudocode 500 details mapping features to the product (fully connected), dropping common words and unnecessary features (drop out), and finally map remaining features to the product.

It is to be appreciated that this particular pseudocode shows just one example implementation of a process for identifying hierarchical relationships among given data, and alternative implementations of the process can be used in other embodiments.

Figure 6:
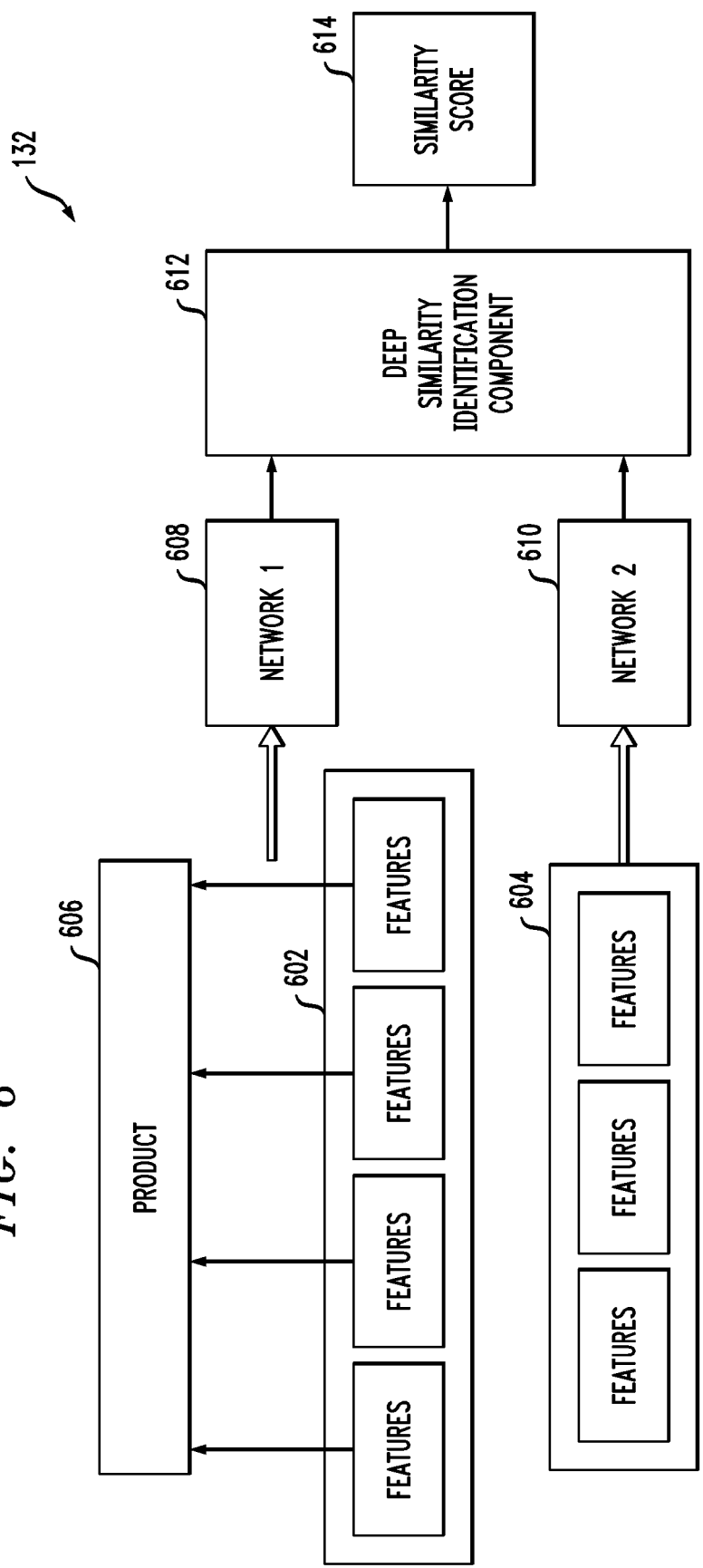
FIG. 6 shows system architecture for a deep similarity network in an illustrative embodiment of the invention.

FIG. 6 shows system architecture for the deep similarity network 132 in an illustrative embodiment of the invention. In one or more embodiments of the invention, the deep similarity network 132 is able to process and understand synonyms, and can generate a high level of accuracy in matching large sentences without breaking the text into smaller chunks. Accordingly, as depicted in FIG. 6, the deep similarity network 132 can predict the identity of a product based on various natural text inputs.

For example, output from the deep learning-based scraper 130, including extracted features 602 related to product 606 and product mapping data, can be provided to a first network 608 (for example, in a low-level representation), and multiple additional features 604 (for example, all possible features) related to one or more products can be provided to a second network 610. The first network 608 and the second network 610 can then provide inputs to a deep learning similarity component 612, which can identify one or more similarities between the words of the inputs, generate similarity scores 614 for one or more products based on the identified similarities, and retrieve one or more products based on such scoring.

Figure 7:
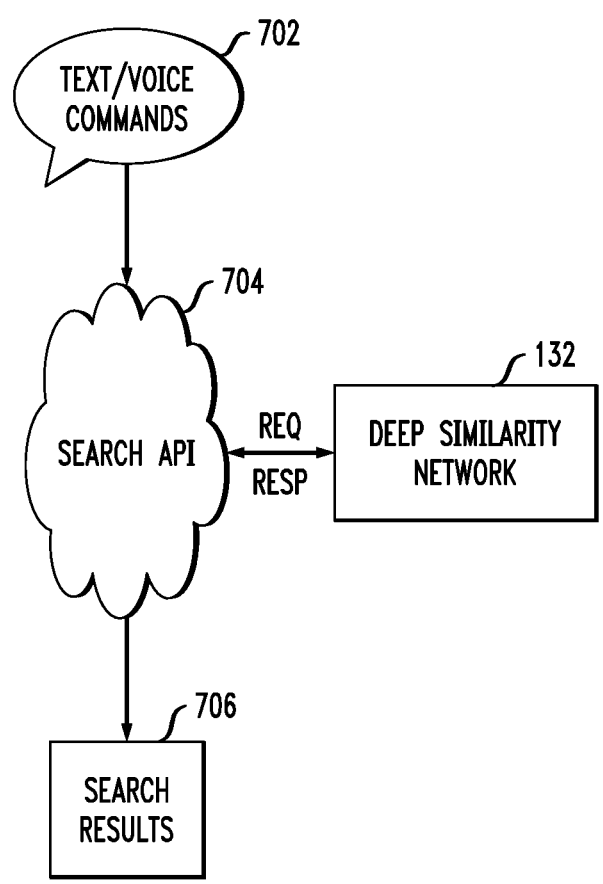
FIG. 7 shows a workflow for processing user search queries in an illustrative embodiment of the invention.

FIG. 7 shows a workflow for processing user search queries in an illustrative embodiment of the invention. At least one embodiment of the invention can include implementing a virtual sales agent using one or more of the techniques and/or mechanisms detailed herein. As depicted in FIG. 7, such a virtual sales agent can include a search application programming interface (API) 704, which can process text and/or voice commands 702 and generate, in conjunction with the deep similarity network 132, search results 706 based thereon. Accordingly, such a virtual sales agent is capable of conversing with a user, processing text- or voice-based requirements, and identifying the most suitable product(s) via interaction with the deep similarity network 132.

Figure 8:
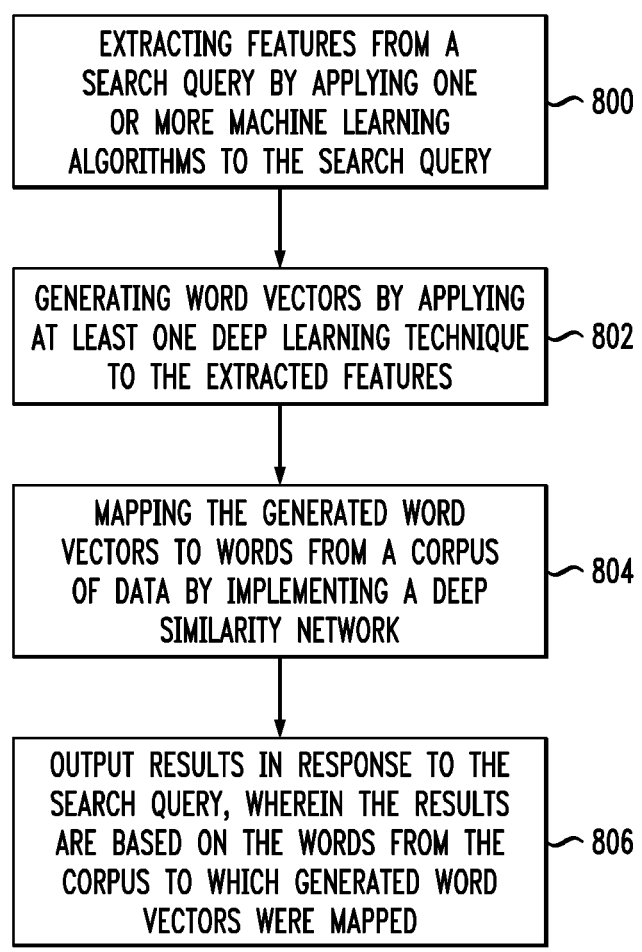
FIG. 8 is a flow diagram of a process for dynamically updating and responding to search queries in an illustrative embodiment.

FIG. 8 is a flow diagram of a process for dynamically updating and responding to search queries in an illustrative embodiment. It is to be understood that this particular process is only an example, and additional or alternative processes can be carried out in other embodiments.

In this embodiment, the process includes steps 800 through 806. These steps are assumed to be performed by the processor 120 utilizing its modules 130, 132 and 134.

Step 800 includes extracting one or more features from a search query by applying one or more machine learning algorithms to the search query. The one or more machine learning algorithms comprise one or more natural language processing algorithms including, for example, a latent Dirichlet allocation (LDA). Additionally, wherein the search query can include a text-based search query and/or a voice-based search query. Further, in one or more embodiments of the invention, the search query can include an e-commerce search query.

Step 802 includes generating one or more word vectors by applying at least one deep learning technique to the one or more extracted features. The at least one deep learning technique can include, for example, implementing one or more deep neural networks.

Step 804 includes mapping the one or more generated word vectors to one or more words from a corpus of data by implementing at least one deep similarity network. The at least one natural language processing model can include at least one neural network model (such as, for example, at least one word2vec neural network model). Also, the corpus of data can include information pertaining to a collection of products, and can be based at least in part on one or more user reviews, call data, one or more product catalogs, etc.

Additionally, at least one embodiment of the invention can include determining a measure of similarity between the one or more generated word vectors and the one or more words from the corpus, wherein the measure of similarity can include a cosine similarity.

Step 806 includes outputting one or more results in response to the search query, wherein the one or more results are based at least in part on the one or more words from the corpus to which the one or more generated word vectors were mapped.

Accordingly, the particular processing operations and other network functionality described in conjunction with the flow diagram of FIG. 8 are presented by way of illustrative example only, and should not be construed as limiting the scope of the invention in any way. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments are configured to identify a product given informal natural language text- or voice-based input from a user. These and other embodiments can provide more accurate search results, and can also be configured to work with one or more cognitive assistants and speech engines.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
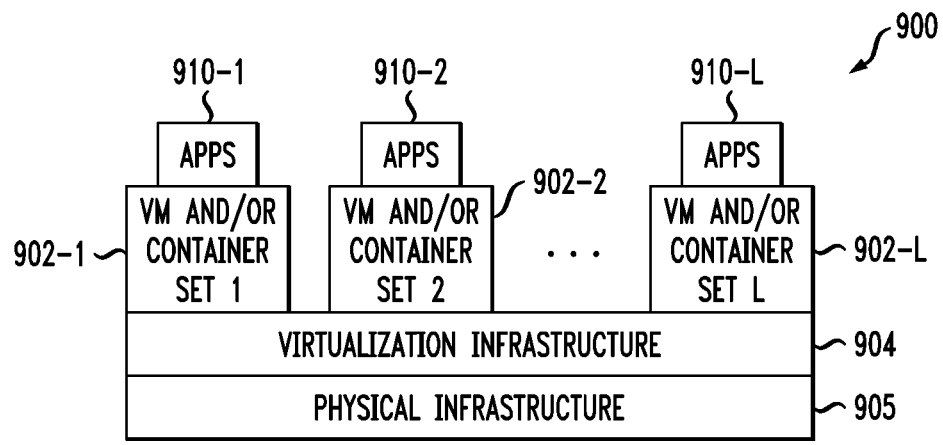
FIGS. 9 and 10 show examples of processing platforms that may be utilized to implement at least a portion of an information processing system in illustrative embodiments.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

Figure 10:
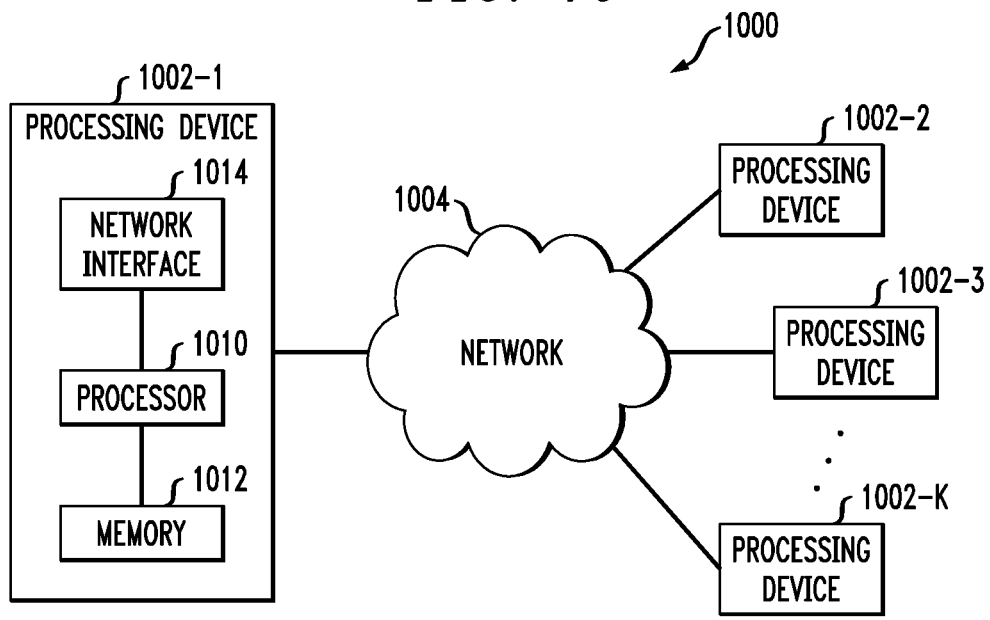

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide accurate and improved results to search queries. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   generating one or more data sources pertaining to technology-related products based at least in part on processing user reviews pertaining to one or more technology-related products, call data related to interactions with one or more users pertaining to one or more technology-related products, and one or more technology-related product catalogs;
   extracting, using one or more machine learning algorithms, one or more features from the one or more data sources pertaining to technology-related products by dividing text from the one or more data sources pertaining to technology-related products into a plurality of word portions, at least some of the plurality of word portions being of equal length, and wherein using the one or more machine learning algorithms comprises generating an output by processing the plurality of word portions using at least one machine learning hashing algorithm comprising a predetermined number of bins, wherein using the at least one machine learning hashing algorithm comprises (i) converting, using at least a portion of the predetermined number of bins, at least a portion of characters present in the word portions into a number within a predetermined range of values, (ii) converting the word portions to hash values, and (iii) associating the hash values with the corresponding numbers within the predetermined range of values associated with the at least a portion of characters in the given word portions;
   generating one or more word vectors by applying at least one deep learning technique to the one or more extracted features, wherein applying the at least one deep learning technique to the one or more extracted features comprises determining one or more hierarchical relationships among at least a portion of the one or more extracted features by processing the generated output of the at least one machine learning hashing algorithm using at least one neural network;
   mapping, using at least one deep similarity network, at least a portion of the one or more generated word vectors to one or more portions of text derived from a search query, wherein the search query comprises an e-commerce search query; and
   outputting, based at least in part on the mapping, one or more results in response to the search query;
   wherein the method is performed by at least one processing device comprising a processor coupled to a memory.

2. The computer-implemented method of claim 1, wherein the one or more machine learning algorithms comprise one or more natural language processing algorithms.

3. The computer-implemented method of claim 1, wherein the one or more machine learning algorithms comprises a latent Dirichlet allocation (LDA).

4. The computer-implemented method of claim 1, wherein the search query comprises a text-based search query.

5. The computer-implemented method of claim 1, wherein the search query comprises a voice-based search query.

6. The computer-implemented method of claim 2, wherein the one or more natural language processing algorithms comprise at least one neural network model.

7. The computer-implemented method of claim 6, wherein the at least one neural network model comprises at least one word2vec neural network model.

8. The computer-implemented method of claim 1, further comprising:
   determining a measure of similarity between the one or more generated word vectors and the one or more portions of text derived from the search query.

9. The computer-implemented method of claim 8, wherein the measure of similarity comprises a cosine similarity.

10. A non-transitory processor-readable storage medium having stored therein program code of one or more software programs, wherein the program code when executed by at least one processing device causes said at least one processing device:
    to generate one or more data sources pertaining to technology-related products based at least in part on processing user reviews pertaining to one or more technology-related products, call data related to interactions with one or more users pertaining to one or more technology-related products, and one or more technology-related product catalogs;
    to extract, using one or more machine learning algorithms, one or more features from the one or more data sources pertaining to technology-related products by dividing text from the one or more data sources pertaining to technology-related products into a plurality of word portions, at least some of the plurality of word portions being of equal length, and wherein using the one or more machine learning algorithms comprises generating an output by processing the plurality of word portions using at least one machine learning hashing algorithm comprising a predetermined number of bins, wherein using the at least one machine learning hashing algorithm comprises (i) converting, using at least a portion of the predetermined number of bins, at least a portion of characters present in the word portions into a number within a predetermined range of values, (ii) converting the word portions to hash values, and (iii) associating the hash values with the corresponding numbers within the predetermined range of values associated with the at least a portion of characters in the given word portions;

to generate one or more word vectors by applying at least one deep learning technique to the one or more extracted features, wherein applying the at least one deep learning technique to the one or more extracted features comprises determining one or more hierarchical relationships among at least a portion of the one or more extracted features by processing the generated output of the at least one machine learning hashing algorithm using at least one neural network;

to map, using at least one deep similarity network, at least a portion of the one or more generated word vectors to one or more portions of text derived from a search query, wherein the search query comprises an e-commerce search query; and to output, based at least in part on the mapping, one or more results in response to the search query.

11. The non-transitory processor-readable storage medium of claim 10, wherein the one or more machine learning algorithms comprise one or more natural language processing algorithms.

12. The non-transitory processor-readable storage medium of claim 11, wherein the one or more natural language processing algorithms comprise at least one neural network model.

13. The non-transitory processor-readable storage medium of claim 10, wherein the one or more machine learning algorithms comprises a latent Dirichlet allocation (LDA).

14. The non-transitory processor-readable storage medium of claim 10, wherein the search query comprises one of a text-based search query and a voice-based search query.

15. An apparatus comprising:
at least one physical processing device comprising a physical processor coupled to a memory;
the at least one physical processing device being configured:
to generate one or more data sources pertaining to technology-related products based at least in part on processing user reviews pertaining to one or more technology-related products, call data related to interactions with one or more users pertaining to one or more technology-related products, and one or more technology-related product catalogs;

to extract, using one or more machine learning algorithms, one or more features from the one or more data sources pertaining to technology-related products by dividing text from the one or more data sources pertaining to technology-related products into a plurality of word portions, at least some of the plurality of word portions being of equal length, and wherein using the one or more machine learning algorithms comprises generating an output by processing the plurality of word portions using at least one machine learning hashing algorithm comprising a predetermined number of bins, wherein using the at least one machine learning hashing algorithm comprises (i) converting, using at least a portion of the predetermined number of bins, at least a portion of characters present in the word portions into a number within a predetermined range of values, (ii) converting the word portions to hash values, and (iii) associating the hash values with the corresponding numbers within the predetermined range of values associated with the at least a portion of characters in the given word portions;

to generate one or more word vectors by applying at least one deep learning technique to the one or more extracted features, wherein applying the at least one deep learning technique to the one or more extracted features comprises determining one or more hierarchical relationships among at least a portion of the one or more extracted features by processing the generated output of the at least one machine learning hashing algorithm using at least one neural network;

to map, using at least one deep similarity network, at least a portion of the one or more generated word vectors to one or more portions of text derived from a search query, wherein the search query comprises an e-commerce search query; and to output, based at least in part on the mapping, one or more results in response to the search query.

16. The apparatus of claim 15, wherein the one or more machine learning algorithms comprise one or more natural language processing algorithms.

17. The apparatus of claim 16, wherein the one or more natural language processing algorithms comprise at least one neural network model.

18. The apparatus of claim 15, wherein the one or more machine learning algorithms comprises a latent Dirichlet allocation (LDA).

19. The apparatus of claim 15, wherein the search query comprises a text-based search query.

20. The apparatus of claim 15, wherein the search query comprises a voice-based search query.

* * * * *